United States Patent
Seto et al.

(10) Patent No.: US 12,455,589 B2
(45) Date of Patent: Oct. 28, 2025

(54) SHIFT DEVICE

(71) Applicant: KABUSHIKI KAISHA TOKAI-RIKA-DENKI-SEISAKUSHO, Aichi-ken (JP)

(72) Inventors: Haruki Seto, Aichi (JP); Kazuhiro Saito, Aichi (JP)

(73) Assignee: KABUSHIKI KAISHA TOKAI-RIKA-DENKI-SEISAKUSHO, Aichi-ken (JP)

(*) Notice: Subject to any disclaimer, the term of this patent is extended or adjusted under 35 U.S.C. 154(b) by 3 days.

(21) Appl. No.: 18/209,368

(22) Filed: Jun. 13, 2023

(65) Prior Publication Data

US 2023/0409071 A1 Dec. 21, 2023

(30) Foreign Application Priority Data

Jun. 17, 2022 (JP) .................. 2022-098395

(51) Int. Cl.
*F16H 59/08* (2006.01)
*F16H 59/10* (2006.01)
*G05G 5/03* (2008.04)

(52) U.S. Cl.
CPC .............. *G05G 5/03* (2013.01); *F16H 59/08* (2013.01); *F16H 2059/081* (2013.01); *F16H 59/105* (2013.01); *G05G 2505/00* (2013.01)

(58) Field of Classification Search
CPC ......... Y10T 74/20636; F16H 2059/047; F16H 2059/081; F16H 59/08; F16H 59/105; F16H 2059/0239; B25J 15/0616; G05G 2505/00; G05G 5/03; H01H 21/50
USPC ............ 74/102, 532, 531, 529, 527, 473.25, 74/473.3, 10.41, 473.1
See application file for complete search history.

(56) References Cited

U.S. PATENT DOCUMENTS

| | | | |
|---|---|---|---|
| 10,436,317 B2 * | 10/2019 | Kim | F16H 59/0278 |
| 2017/0037962 A1 * | 2/2017 | Moreno Colom | F16H 61/24 |
| 2018/0094720 A1 * | 4/2018 | Colom | F16H 61/24 |

FOREIGN PATENT DOCUMENTS

| | | | | |
|---|---|---|---|---|
| DE | 10154692 B4 * | 2/2005 | ........... | B25B 31/005 |
| DE | 102004033446 A1 * | 7/2005 | ........... | B60Q 1/1469 |
| EP | 2728224 A1 * | 5/2014 | ............. | B60K 37/06 |
| EP | 3128209 A1 * | 2/2017 | ......... | F16H 59/0208 |
| JP | 2007-283818 A | 11/2007 | | |
| WO | WO-03030197 A1 * | 4/2003 | ........... | B60Q 1/1461 |
| WO | WO-2014198293 A1 * | 12/2014 | ............. | F16H 61/22 |
| WO | WO-2015177186 A2 * | 11/2015 | ......... | F16H 59/0278 |

* cited by examiner

*Primary Examiner* — T. Scott Fix

(74) *Attorney, Agent, or Firm* — Studebaker Brackett PLLC

(57) ABSTRACT

A shift device comprises a shift body, a click mechanism and a guide portion. The shift body is moved to change a shift position of the shift body. The click mechanism has a click member and a click surface against which the click member is biased to abut. The click mechanism is configured so that, when the shift body is movably operated, one of the click member or the click surface moves in accompaniment with movement of the shift body and imparts a clicking feel to the shift body. The guide portion guides the click member to the click surface and is disposed in a position in which it does not oppose the click surface.

12 Claims, 10 Drawing Sheets

SHIFT DEVICE

CROSS-REFERENCE TO RELATED APPLICATION

This application claims priority under 35 USC 119 from Japanese Patent Application No. 2022-98395 filed on Jun. 17, 2022, the disclosure of which is incorporated by reference herein in its entirety.

BACKGROUND

Technical Field

The present disclosure relates to a shift device where a shift body is moved to change a shift position of the shift body.

Related Art

Japanese Patent Application Laid-open (JP-A) No. 2007-283818 discloses a shift click setting device for an automatic transmission where a click pin (click member) is slidably inserted into a guide hole formed in a shift lever assembly and is always biased by a spring member attached between a bottom surface of the click pin and a bottom surface of the guide hole.

In this device, a part that guides the click pin is set to not abut against a click pin abutment surface (click surface) in a position in which it opposes the click pin abutment surface, and there is room for improvement from the standpoint of reducing, in the guidance direction of the click pin, the size of the structure for imparting a clicking feel.

SUMMARY

In consideration of the above circumstances, it is an object of the present disclosure to obtain a shift device that can reduce, in the guidance direction of a click member, the size of a structure for imparting a clicking feel.

A shift device of a first aspect of the disclosure includes: a shift body that is moved to change a shift position of the shift body; a click mechanism having a click member and a click surface against which the click member is biased to abut, the click mechanism being configured so that when the shift body is movably operated, one of the click member or the click surface moves in accompaniment with movement of the shift body and imparts a clicking feel to the shift body; and a guide portion that guides the click member to the click surface and that is disposed in a position in which it does not oppose the click surface.

A shift device of a second aspect of the disclosure is the shift device of the first aspect of the disclosure, wherein the guide portion is provided as a pair in positions offset on both lateral sides relative to the click surface as seen from an opposite side of the click surface.

A shift device of a third aspect of the disclosure is the shift device of the first aspect of the disclosure, wherein the guide portion is a guide insertion portion that is formed in such a way that the click member can be inserted therein and that extends in a direction in which it guides the click member, and the click member has a guided portion that extends in a direction in which it is guided by the guide insertion portion and that is inserted into the guide insertion portion.

A shift device of a fourth aspect of the disclosure is the shift device of the third aspect of the disclosure, wherein a distal end portion of the guide insertion portion in the guidance direction is open, and in the guide insertion portion are step portions that make a width of first constituent portions, where the guided portion is inserted into a part of the guide insertion portion on an opposite side from the distal end portion side, smaller than a width of second constituent portions, where the guided portion is inserted into another part of the guide insertion portion.

In the shift device of the first aspect of the disclosure, the shift body is moved to change the shift position of the shift body. Furthermore, the click mechanism that biases the click member to abut against the click surface is configured so that when the shift body is movably operated, one of the click member and the click surface moves in accompaniment with movement of the shift body and imparts a clicking feel to the shift body.

Here, the guide portion that guides the click member to the click surface is disposed in a position in which it does not oppose the click surface. For this reason, compared to a contrasting structure where, for example, the guide portion that guides the click member is disposed in a position in which it opposes the click surface, the structure for imparting the clicking feel can be reduced in size in the guidance direction of the click member.

In the shift device of the second aspect of the disclosure, the guide portion is provided as a pair in positions offset on both lateral sides relative to the click surface as seen from an opposite side of the click surface. For this reason, the pair of guide portions can stably guide the click member to the click surface.

In the shift device of the third aspect of the disclosure, the guide insertion portion serving as the guide portion is formed in such a way that the click member can be inserted therein and that extends in the direction in which it guides the click member, and the guided portion of the click member extends in the direction in which it is guided by the guide insertion portion and that is inserted into the guide insertion portion. For this reason, rattling of the click member guided by the guide insertion portion is inhibited.

In the shift device of the fourth aspect of the disclosure, the distal end portion of the guide insertion portion in the guidance direction side is open. Furthermore, in the guide insertion portion are step portions that make a width of the first constituent portions, where the guided portion is inserted into the part of the guide insertion portion on an opposite side from the distal end portion side, smaller than the width of the second constituent portions, where the guided portion is inserted into another part of the guide insertion portion. For this reason, enlargement of the width dimensions of the first constituent portions and the second constituent portions due to the draft angle of a molding die for forming the first constituent portions and the second constituent portions can be reduced, and rattling of the guided portion relative to the first constituent portions and the second constituent portions can be inhibited.

DETAILED DESCRIPTION

First Embodiment

Figure 1:
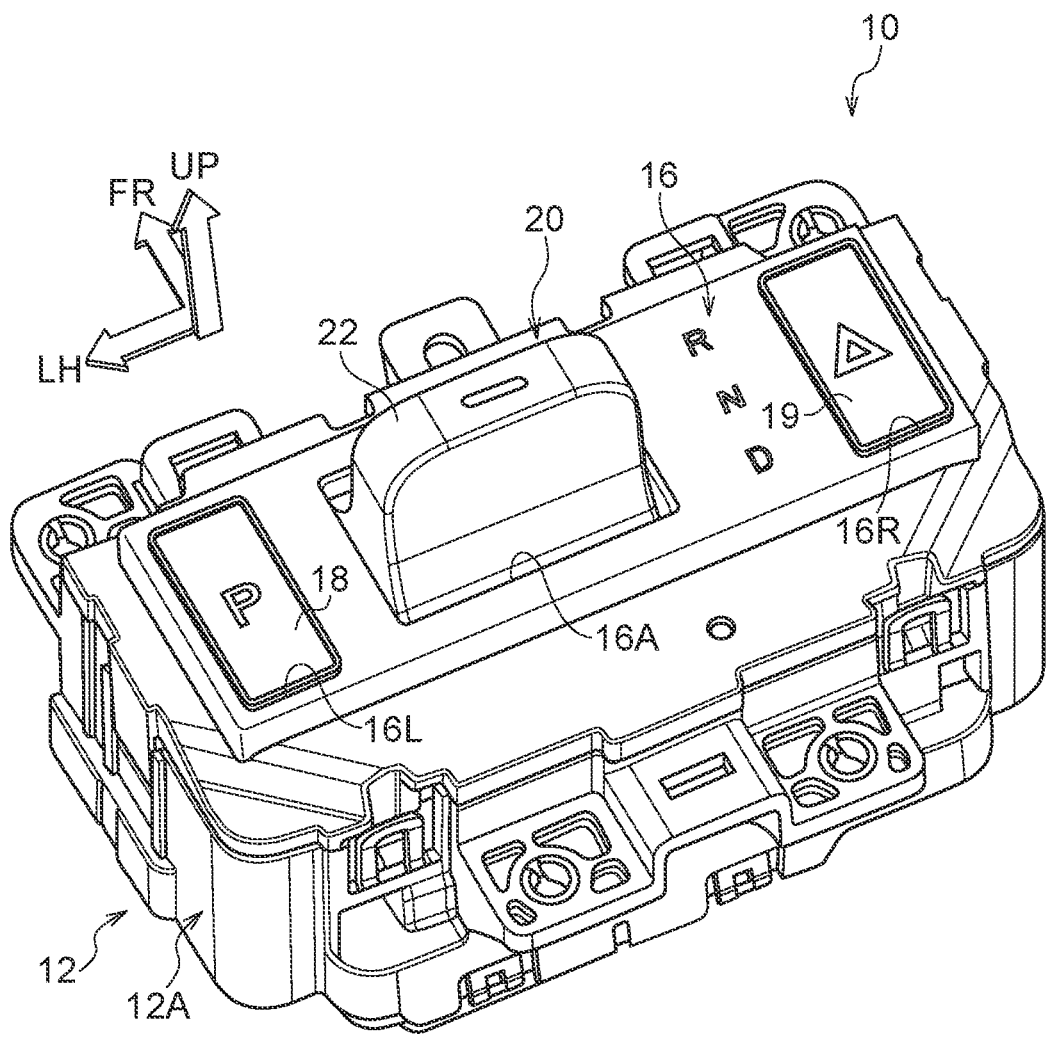
FIG. 1 is a perspective view showing a shift device pertaining to a first embodiment of the disclosure as seen from the rear left side and obliquely from the upper side.

In FIG. 1 a shift device 10 pertaining to a first embodiment of the disclosure is shown in a perspective view seen from the rear left side and obliquely from the upper side. Furthermore, in FIG. 2 part of the structure of the shift device 10 is shown in an exploded perspective view seen from the rear left side and obliquely from the upper side. It will be noted that, in the drawings, arrow FR indicates a forward direction of the shift device 10, arrow LH indicates a leftward direction of the shift device 10, and arrow UP indicates an upward direction of the shift device 10.

The shift device 10 pertaining to the present embodiment shown in FIG. 1 is a shift-by-wire type of shift device, is installed in a console (not shown in the drawings) of a vehicle (an automobile) as an example, and is disposed on the vehicle front side and the vehicle width direction inner side of a driver's seat (not shown in the drawings) in the vehicle. The forward direction, the leftward direction, and the upward direction of the shift device 10 are aligned with the forward direction, the leftward direction, and the upward direction, respectively, of the vehicle.

Figure 2:
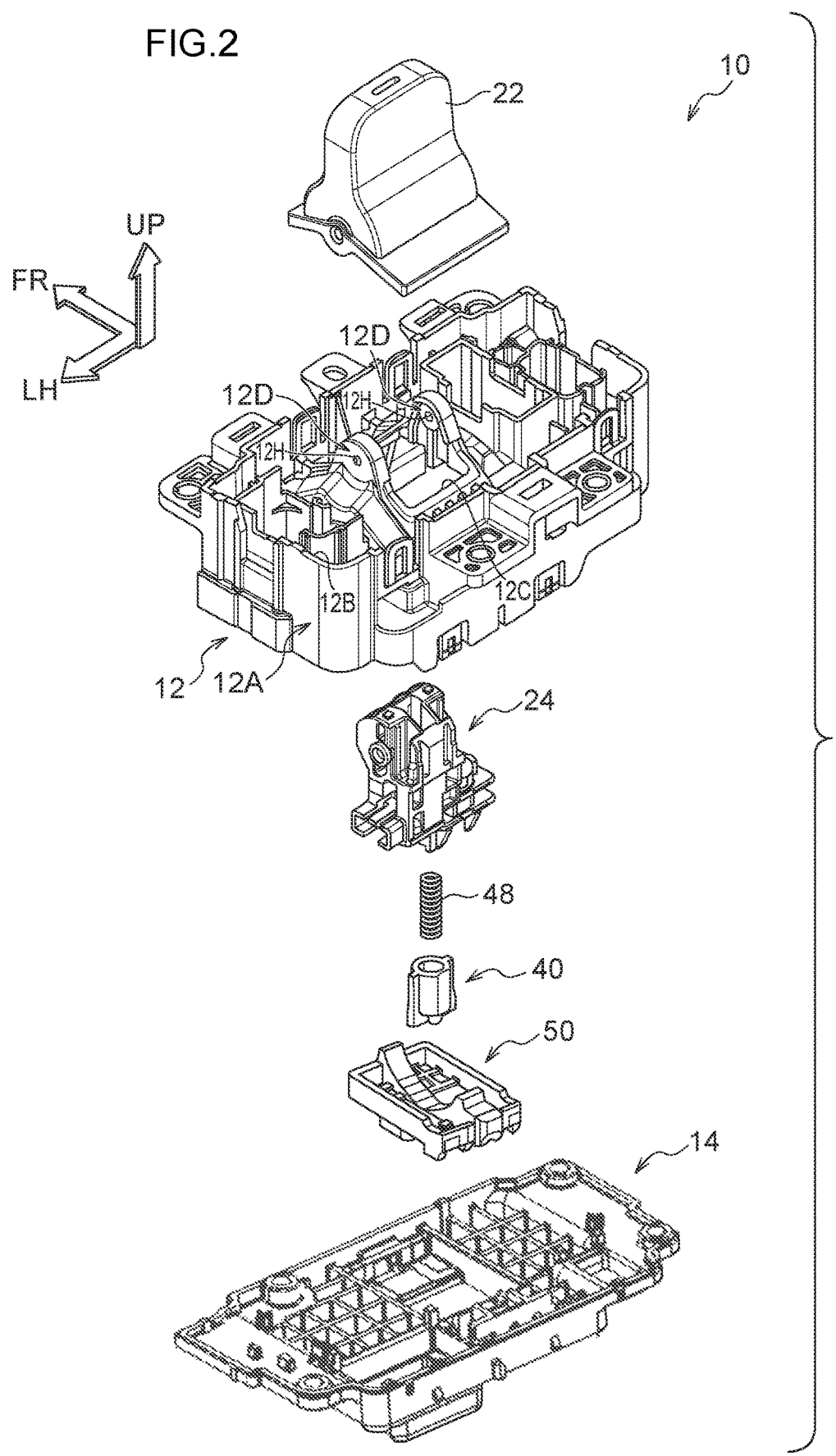
FIG. 2 is an exploded perspective view showing part of the structure of the shift device pertaining to the first embodiment of the disclosure as seen from the rear left side and obliquely from the upper side.

As shown in FIG. 1 and FIG. 2, the shift device 10 includes an upper case 12. The upper case 12 is configured to include an outer enclosure 12A. The lower side of the outer enclosure 12A of the upper case 12 is closed off by a lower case 14 shown in FIG. 2. Furthermore, the center portion of the upper case 12 as seen in a plan view is a through portion 12C formed through the upper case 12 in the up and down direction. Moreover, bearing portions 12D that project upward are formed on both left and right sides of the through portion 12C in the upper case 12. In the left and right pair of bearing portions 12D, pass-through holes 12H are formed through the bearing portions 12D in the left and right direction.

As shown in FIG. 1, a tabular cover member 16 is secured to the upper end portion of the outer enclosure 12A of the upper case 12. The cover member 16 is disposed so as to close off from above an open portion 12B (see FIG. 2) of the upper end portion of the outer enclosure 12A. The upper surface of the cover member 16 is a design surface. A first pass-through hole 16L substantially in the shape of a rectangle whose longitudinal direction coincides with the front and rear direction is formed through the left-side part of the cover member 16 in the up and down direction. A second pass-through hole 16A substantially in the shape of a rectangle whose longitudinal direction coincides with the left and right direction is formed through the left and right direction center portion of the cover member 16 in the up and down direction. A third pass-through hole 16R substantially in the shape of a rectangle whose longitudinal direction coincides with the front and rear direction is formed through the right-side part of the cover member 16 in the up and down direction.

In the first pass-through hole 16L is disposed a pressingly operable parking (P) switch 18. Furthermore, in the third pass-through hole 16R is disposed a pressingly operable hazard switch 19. Detailed description of the P switch 18 and the hazard switch 19 will be omitted.

Through the second pass-through hole 16A is passed a shift lever 20 serving as a shift body. The shift lever 20 projects from the inside of the upper case 12 and is pivoted (moved) about an axis in the left and right direction to change the shift position of the shift lever 20. That is, the shift lever 20 is configured to be pivotally operable in the front and rear direction by an occupant (particularly a driver) of the vehicle, and is pivotally operable, from the front side to the rear side, to shift positions including a reverse (R) position, a neutral (N) position, and a drive (D) position.

The distal end portion side of the shift lever 20 is configured by a knob 22. The knob 22 is secured to a lever body 24 shown in FIG. 2. The lever body 24 is made of resin and provided in the through portion 12C of the upper case 12, so that the upper portion of the lever body 24 is disposed inside the knob 22. Furthermore, to the base end portion of the knob 22 and the upper portion of the lever body 24 is secured a pivot shaft (not shown in the drawings) that runs through them in the left and right direction. The pivot shaft is rotatably passed through the pass-through holes 12H in the left and right pair of bearing portions 12D and is pivotably supported by the bearing portions 12D.

Figure 3:
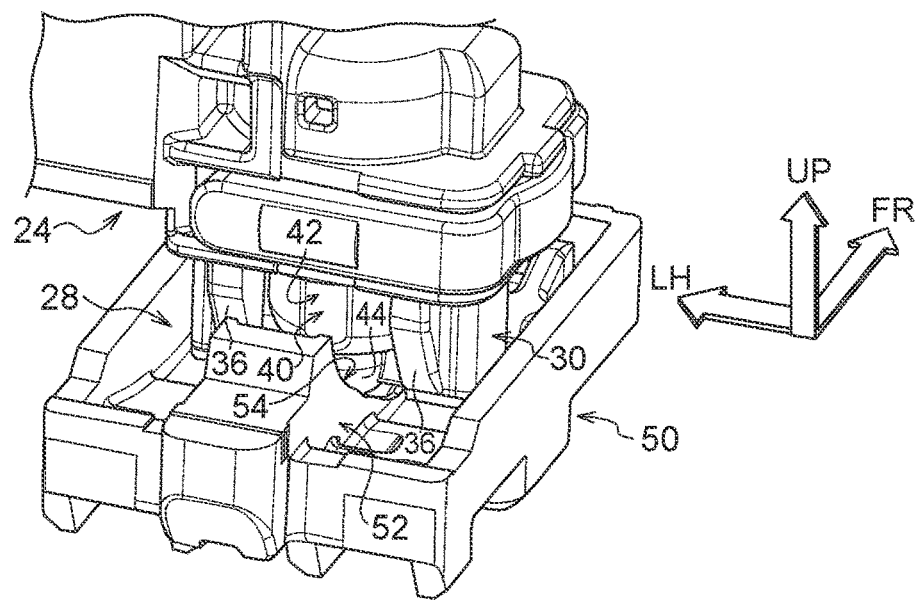
FIG. 3 is a perspective view showing a lower portion of a lever body and the area therearound in the shift device pertaining to the first embodiment of the disclosure as seen from the rear right side and obliquely from the upper side.
Figure 4:
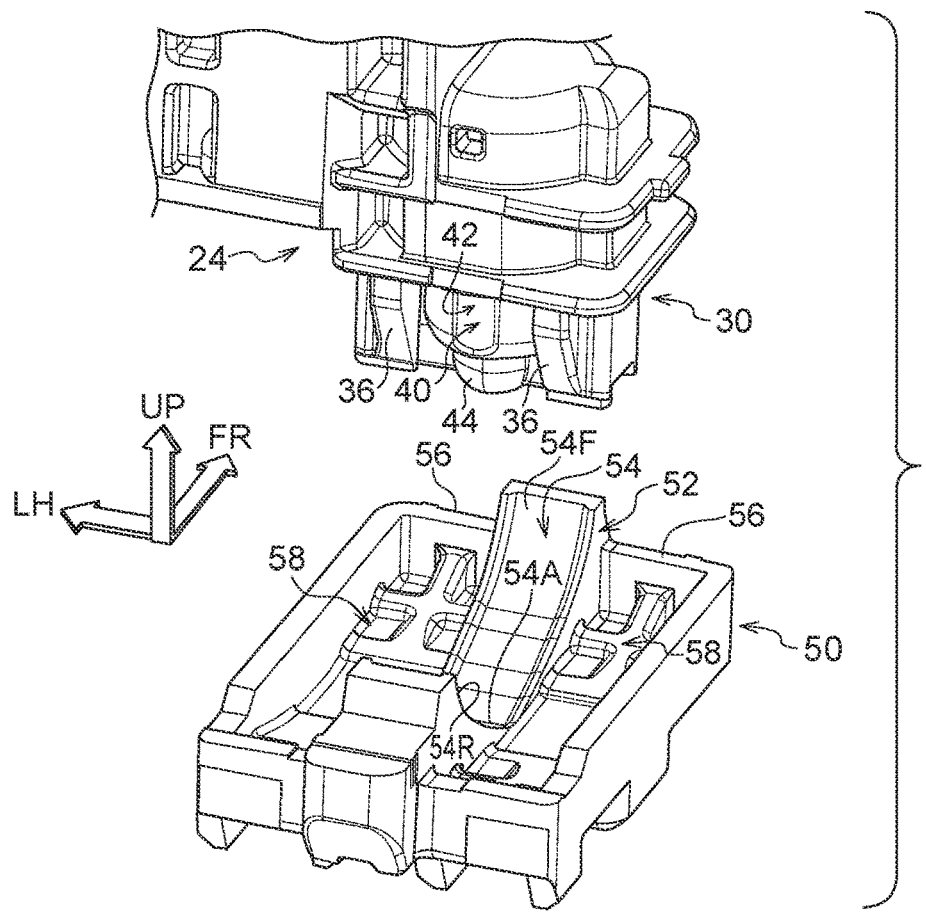
FIG. 4 is a perspective view showing a click-use plate detached downward in the structure shown in FIG. 3.

In FIG. 3 the lower portion of the lever body 24 and the area therearound are shown in a perspective view seen from the right rear side and obliquely from the upper side. Furthermore, in FIG. 4 is shown a perspective view in which part of the structure shown in FIG. 3 is detached downward. As shown in FIG. 3 and FIG. 4, in the lower portion of the lever body 24 is provided an attachment receiving portion 30 to which other members are attached.

Figure 5:
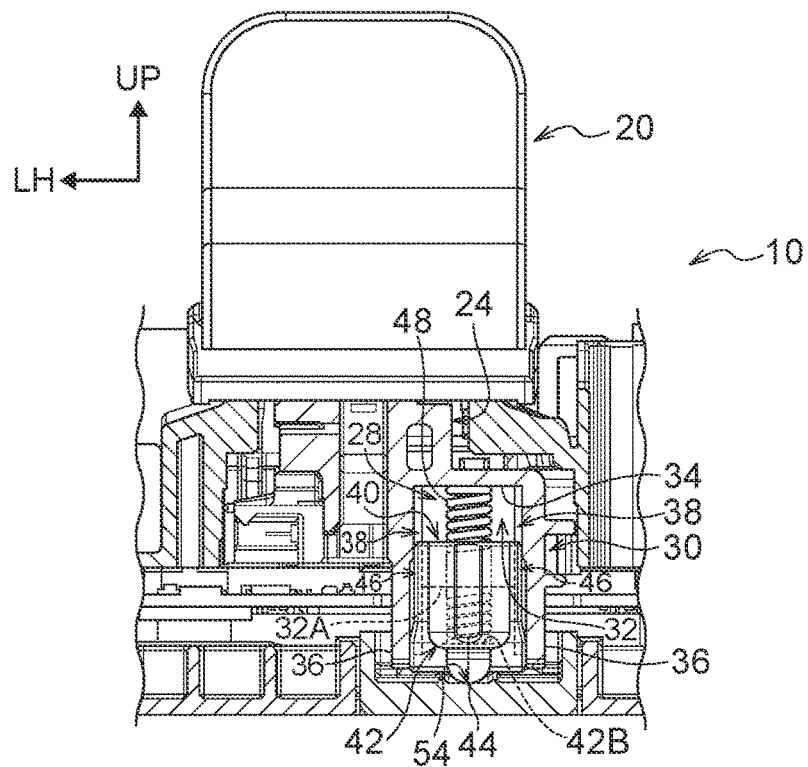
FIG. 5 is a longitudinal sectional view, cut along the left and right direction, showing the inside of the shift device pertaining to the first embodiment of the disclosure in a state in which a shift lever is in an initial position.
Figure 10:
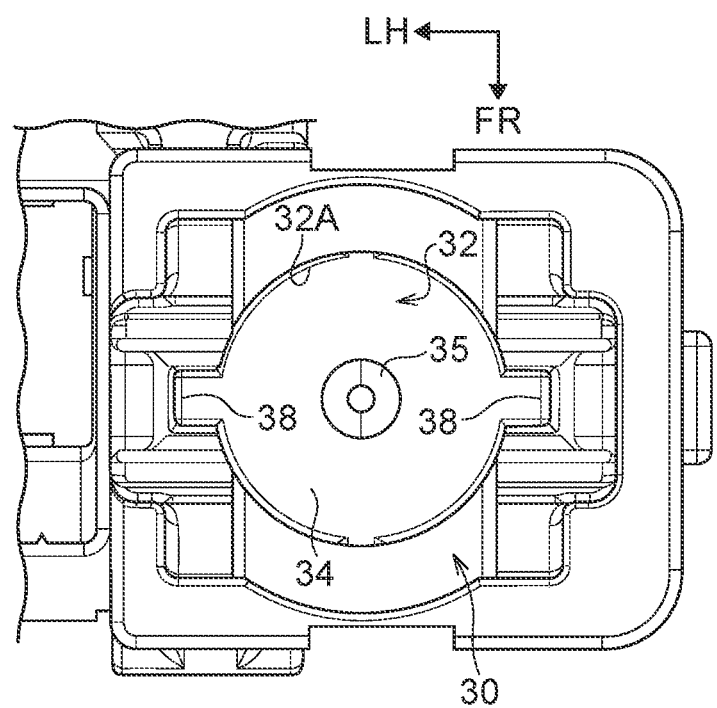
FIG. 10 is a bottom view of an attachment receiving portion of the lever body in the shift device pertaining to the first embodiment of the disclosure as seen from the lower side.

In FIG. 5 is shown a longitudinal sectional view, cut along the left and right direction, showing the inside of the shift device 10 in a state in which the shift lever 20 is in an initial position (the state shown in FIG. 1). It will be noted that for the sake of convenience FIG. 5 shows not the sectional shape of the shift lever 20 but the shape of the shift lever 20 as seen in a back view (the same is also true of FIG. 6). As shown in FIG. 5, the attachment receiving portion 30 includes an insertion hole 32 that is upwardly recessed and opens to the lower side of the lever body 24. In FIG. 10 is shown a bottom view in which the attachment receiving portion 30 of the lever body 24 is seen from the lower side. As shown in FIG. 10, a lower end side open end 32A of the insertion hole 32 is formed substantially in the shape of a circle when seen in its entirety with some parts missing. It will be noted that in FIG. 5 part of the lower end side open end 32A of the insertion hole 32 is indicated by dotted lines (hidden lines).

As shown in FIG. 5, the upper end side of the inside of the insertion hole 32 is configured by a transverse wall portion 34. Furthermore, as shown in FIG. 4 and FIG. 5, the attachment receiving portion 30 includes a pair of pendent portions 36 that are pendent from both left and right sides of the lower end portion of the insertion hole 32. Guide insertion portions 38 (see FIG. 7) serving as guide portions described in detail later are formed ranging from both left and right sides of the insertion hole 32 to the pendent portions 36.

As shown in FIG. 5, inside the insertion hole 32 is disposed a click member 40 configuring part of a click mechanism 28. It will be noted that FIG. 5 shows not the sectional shape of the click member 40 but the shape of the click member 40 as seen in a back view (the same is also true of FIG. 6). Part of the click member 40 is disposed between the left and right pair of pendent portions 36.

Figure 9:
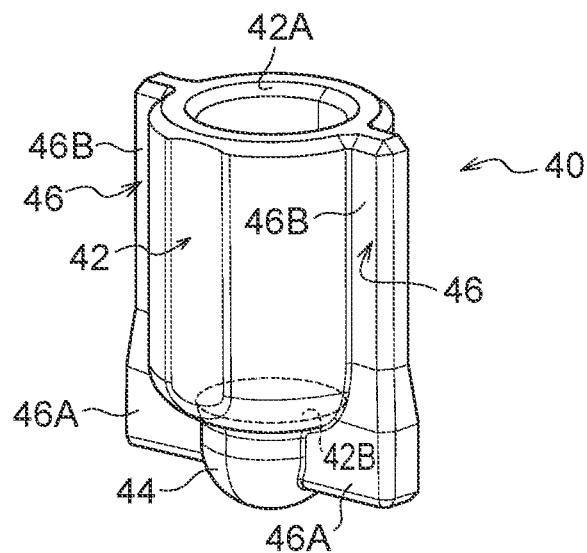
FIG. 9 is a perspective view showing a click member in the shift device pertaining to the first embodiment of the disclosure.

In FIG. 9, the click member 40 is shown by itself in a perspective view. As shown in FIG. 9, the click member 40 includes a cylindrical portion 42. The cylindrical portion 42 is disposed such that its cylinder axis direction coincides with the up and down direction. In the upper end portion of the cylindrical portion 42 is formed an open portion 42A. Furthermore, inside the lower end portion side of the cylindrical portion 42 is formed a seat portion 42B for seating a spring. As shown in FIG. 5, between the transverse wall portion 34 of the lever body 24 and the seat portion 42B of the cylindrical portion 42, a spring 48 configuring part of the click mechanism 28 is disposed. The spring 48 is a compression coil spring and biases the click member 40 downward. It will be noted that, as shown in FIG. 10, on the center portion of the transverse wall portion 34, a spring retaining convex portion 35 that is inserted into the upper end portion side of the spring 48 (see FIG. 5) is formed projecting downward (the near side in the drawing).

As shown in FIG. 9, the click member 40 includes a projecting portion 44 that projects downward from the lower end portion of the cylindrical portion 42. The lower surface of the projecting portion 44 is curved in a convex shape. Furthermore, the click member 40 has a pair of guided portions 46 that jut out from sites of the click member 40 ranging from both sides of the cylindrical portion 42 to both sides of the projecting portion 44 other than its lower portion. The guided portions 46 will be described in detail later.

As shown in FIG. 3 and FIG. 4, on the lower side of the lever body 24 is provided a click-use plate 50 including a click surface 54 configuring part of the click mechanism 28. The click-use plate 50 is secured to the lower case 14 (see FIG. 2). As shown in FIG. 4, in the left and right direction center portion of the click-use plate 50 is formed a slope base portion (also called a "click crest") 52 extending in the front and rear direction as seen in a plan view. Furthermore, on the outer peripheral portion of the click-use plate 50 is formed a vertical wall portion 56 that stands upward. Furthermore, upper surface sides of parts 58 of the click-use plate 50 located on both left and right lateral sides relative to the slope base portion 52 and on the inner side of the vertical wall portion 56 are set lower than the front portion and the rear portion of the slope base portion 52.

Figure 6:
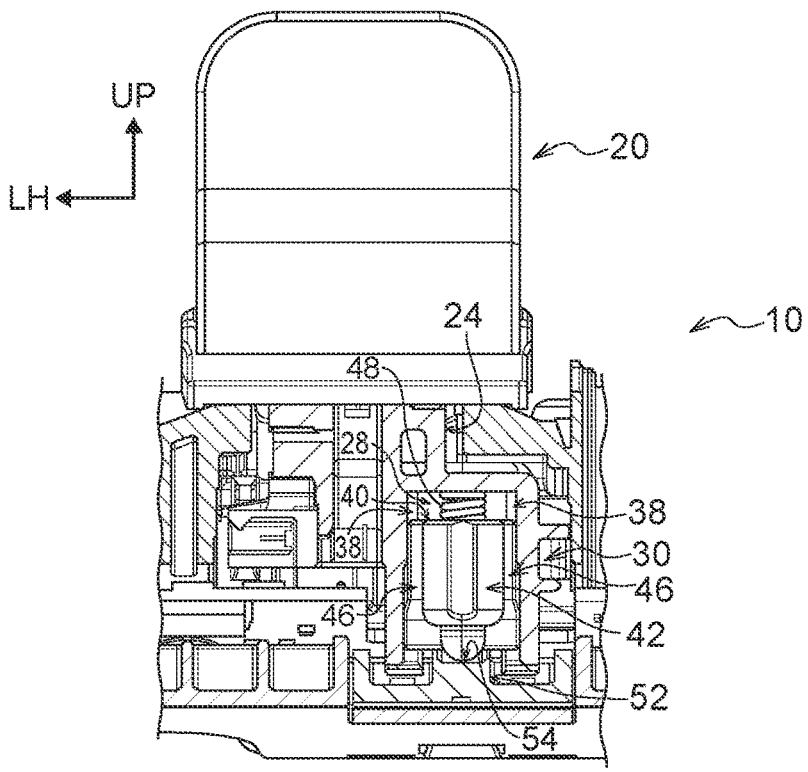
FIG. 6 is a longitudinal sectional view, cut along the left and right direction, showing the inside of the shift device pertaining to the first embodiment of the disclosure in a state in which the shift lever has been operated.

The upper surface portion of the slope base portion 52 is the click surface 54. The click surface 54 slopes downward heading toward the front and rear direction center portion, and the front and rear direction center portion of the click surface 54 is a bottom portion 54A (lower end portion). The bottom portion 54A of the click surface 54 is set in a position farther from the pivot center of the shift lever 20 (see FIG. 1) than a site 54F on the front end portion side of the click surface 54 and a site 54R on the rear end portion side of the click surface 54. Furthermore, as shown in FIG. 6, the left and right direction middle portion of the cylindrical portion 42 of the click member 40 opposes the slope base portion 52, and the diameter of the spring 48 is set to be generally the same as the width of the slope base portion 52.

As shown in FIG. 5, the click member 40 is biased by the spring 48 so that the projecting portion 44 abuts against the click surface 54. Additionally, the click mechanism 28 is configured so that when the shift lever 20 is movingly operated, the click member 40 moves in accompaniment with the movement of the shift lever 20 and imparts a clicking feel to the shift lever 20.

Next, the guided portions 46 formed on the click member 40 and the guide insertion portions 38 formed in the attachment receiving portion 30 of the lever body 24 will be described in detail.

Figure 7:
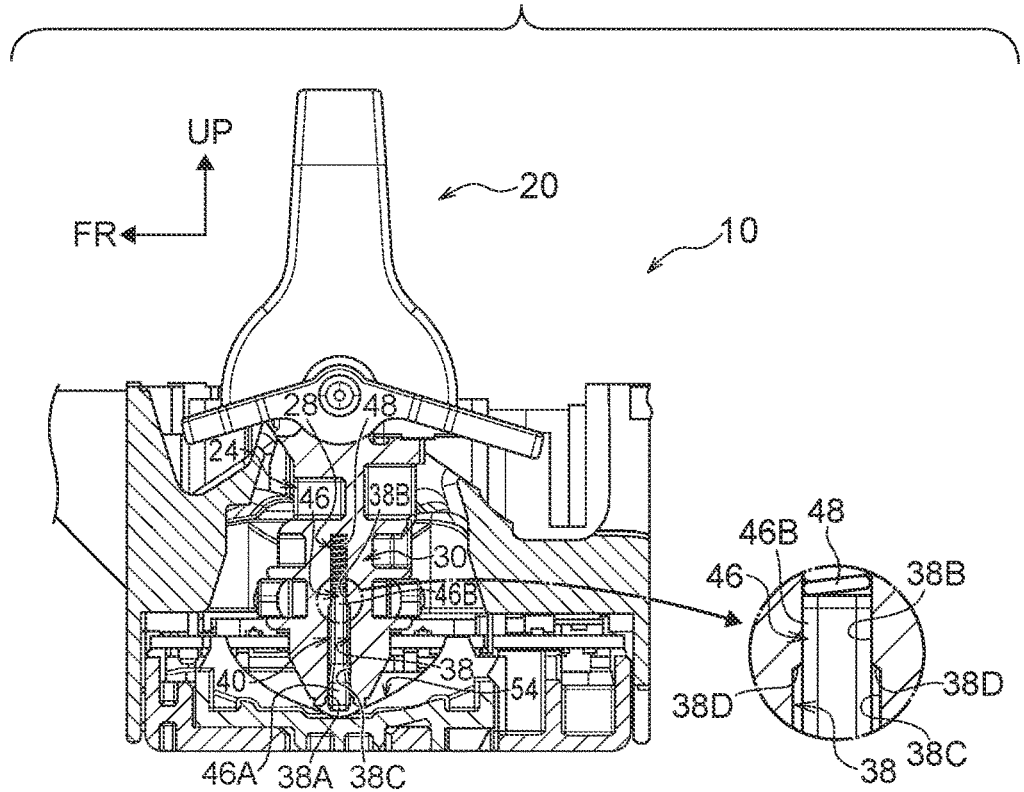
FIG. 7 is a longitudinal sectional view, cut along the front and rear direction, showing the inside of the shift device pertaining to the first embodiment of the disclosure in the state in which the shift lever is in the initial position.
Figure 8:
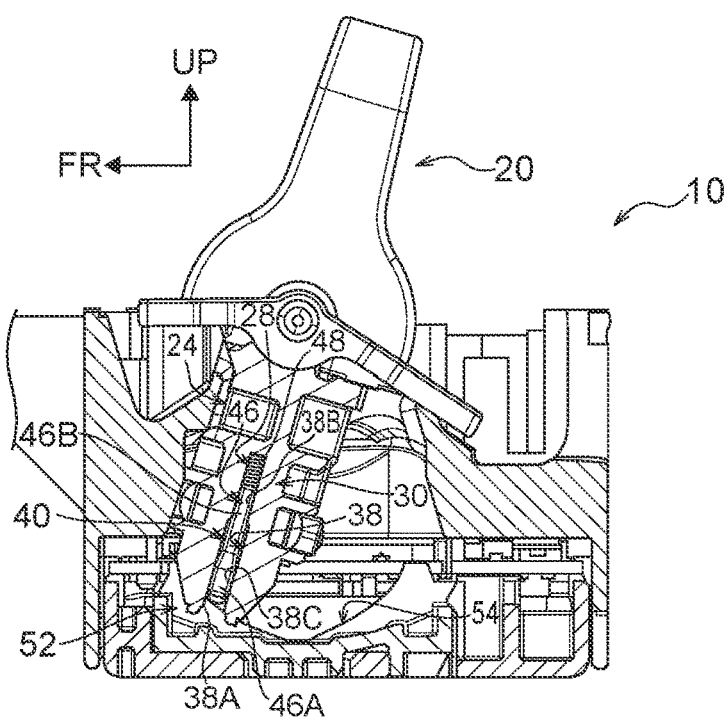
FIG. 8 is a longitudinal sectional view, cut along the front and rear direction, showing the inside of the shift device pertaining to the first embodiment of the disclosure in the state in which the shift lever has been operated.

In FIG. 7 is shown a longitudinal sectional view, cut along the front and rear direction, showing the inside of the shift device 10 in a state in which the shift lever 20 is in the initial position, and in FIG. 8 is shown a longitudinal sectional view, cut along the front and rear direction, showing the inside of the shift device 10 in a state in which the shift lever 20 has been operated. It will be noted that for the sake of convenience FIG. 7 and FIG. 8 show not the sectional shape of the shift lever 20 but the shape of the shift lever 20 as seen in a left side view. Furthermore, in FIG. 6 is shown a longitudinal sectional view, cut along the left and right direction, showing the inside of the shift device 10 in a state in which the shift lever 20 has been operated (the same state as in FIG. 8). As shown in FIG. 5 to FIG. 8, the guide insertion portions 38 formed in the attachment receiving portion 30 of the lever body 24 are parts that guide the click member 40 to the click surface 54. The guide insertion portions 38 are formed as grooves in such a way that the click member 40 can be inserted into them (see FIG. 10) and extend in a direction in which they guide the click member 40. As shown in FIG. 10, the guide insertion portions 38 each have the shape of a rectangular recess as seen in a bottom view. As shown in FIG. 7, the guided portions 46 of the click member 40 extend in the direction in which they are guided by the guide insertion portions 38 and are inserted into the guide insertion portions 38, and are configured to slide in the guide insertion portions 38. Furthermore, the front and rear direction dimension of lower portions 46A of the guided portions 46 is set larger than the front and rear direction dimension of parts 46B of the guided portions 46 other than the lower portions (see FIG. 9).

As shown in FIG. 5 and FIG. 6, the guide insertion portions 38 are disposed in positions in which they do not oppose the click surface 54 in the up and down direction. More specifically, the guide insertion portions 38 are provided as a pair in positions offset on both lateral sides relative to the click surface 54 as seen from the opposite side of the click surface 54. To achieve this configuration, as shown in FIG. 3, the opposing distance between the pair of pendent portions 36 in the attachment receiving portion 30 of the lever body 24 is set greater than the width of the slope base portion 52, and the pair of pendent portions 36 are disposed in positions in which they do not oppose the slope base portion 52.

As shown in FIG. 10, the pair of guide insertion portions 38 are provided in positions in which they oppose each other in the left and right direction and are formed so as to be bilaterally symmetrical. Furthermore, as shown in FIG. 7, distal end portions 38A of the guide insertion portions 38 in the guidance direction open downward. As shown in the partially enlarged view of FIG. 7, in the guide insertion portions 38 are step portions 38D that make the width of first constituent portions 38B, where the guided portions 46 are inserted into parts of the guide insertion portions 38 on the opposite side of the distal end portion 38A side, smaller than the width of second constituent portions 38C, where the guided portions 46 are inserted into the other parts of the guide insertion portions 38. The step portions 38D are provided as a pair on both front and rear direction sides of the guide insertion portions 38.

Next, the action of the present embodiment will be described.

In the shift device 10 shown in FIG. 1 having the above configuration, the shift lever 20 is moved to change the shift position of the shift lever 20. Furthermore, as shown in FIG. 7 and FIG. 8, the click mechanism 28 that biases the click member 40 to abut against the click surface 54 is configured so that when the shift lever 20 is movingly operated, the click member 40 moves in accompaniment with the movement of the shift lever 20 and imparts a clicking feel to the shift lever 20.

Here, as shown in FIG. 5, the guide insertion portions 38 that guide the click member to the click surface 54 are disposed in positions in which they do not oppose the click surface 54 in the up and down direction. For this reason, compared to a contrasting structure where, for example, the guide portions that guide the click member are disposed in positions in which they oppose the click surface in the up and down direction, the structure for imparting the clicking feel can be reduced in size in the guidance direction of the click member 40.

To elaborate on this point, in the contrasting structure, it is necessary to space the distal end portions of the guide portions in the guidance direction a predetermined amount from the click surface to keep the guide portions from abutting against the click surface. Furthermore, it is difficult to shorten the guidance direction length (guide length) along which the guide portions and the click member touch each other because it is necessary to inhibit rattling of the click member. Because of this, in the contrasting structure, it is difficult to reduce, in the guidance direction of the click member, the physical size of the structure for imparting the clicking feel. By contrast, in the shift device 10 of the present embodiment, the guide insertion portions 38 do not oppose the click surface 54 in the up and down direction, so it is not necessary to increase the height position of the guide insertion portions 38 in consideration of the height position of the click surface 54, so the physical size of the structure for imparting the clicking feel can be reduced (in other words, space can be saved) in the guidance direction of the click member 40.

Furthermore, in the present embodiment, as shown in FIG. 8, in a case where the shift lever 20 has been operated, the distal end portions 38A of the guide insertion portions 38 in the guidance direction are disposed on the lateral sides of the slope base portion 52. By configuring the distal end portions 38A to be disposed in this way, the height position of the guide insertion portions 38 is lowered, and the structure for imparting the clicking feel is reduced in size in the guidance direction of the click member 40.

Furthermore, as shown in FIG. 5, in the shift device 10, the guide insertion portions 38 are provided as a pair in positions offset on both lateral sides relative to the click surface 54 as seen from the opposite side of the click surface 54. For this reason, the pair of guide insertion portions 38 can stably guide the click member 40 to the click surface 54.

Furthermore, as shown in FIG. 3, there is a space between the pair of pendent portions 36 in the attachment receiving portion 30 of the shift lever body 24 made of resin, and the size of the pair of pendent portions 36 is kept small. For this reason, even if the dimensions of the pair of pendent portions 36 were to change due to at least one of heat or moisture absorption, the amount of the change is kept small. Consequently, the dimensional accuracy of the attachment receiving portion 30 of the lever body 24 can be improved and, in turn, the product accuracy of the lever body 24 can be improved.

Furthermore, as shown in FIG. 5 and FIG. 7, in the shift device 10, the guide insertion portions 38 are formed in such a way that the click member 40 can be inserted into them, and the guided portions 46 of the click member 40 extend in the direction in which they are guided by the guide insertion portions 38 and are inserted into the guide insertion portions 38. For this reason, rattling of the click member 40 guided by the guide insertion portions 38 is inhibited, and durability can be ensured.

Moreover, in this shift device 10, as shown in FIG. 7, the distal end portions 38A of the guide insertion portions 38 in the guidance direction are open. Furthermore, as shown in the partially enlarged view of FIG. 7, in the guide insertion portions 38 are formed the step portions 38D that make the width of the first constituent portions 38B, where the guided portions 46 are inserted into the parts of the guide insertion portions 38 on the opposite side of the distal end portion 38A side, smaller than the width of the second constituent portions 38C, where the guided portions 46 are inserted into the other parts of the guide insertion portions 38. For this reason, enlargement of the width dimensions (front and rear direction dimensions) of the first constituent portions 38B and the second constituent portions 38C due to the draft angle of a molding die for forming the first constituent portions 38B and the second constituent portions 38C can be reduced. For that reason, rattling of the guided portions 46 in the front and rear direction relative to the first constituent portions 38B and the second constituent portions 38C can be inhibited, and rattling of the click member 40 in the front and rear direction relative to the attachment receiving portion 30 can be inhibited.

Furthermore, in this shift device, as shown in FIG. 6, the left and right direction middle portion of the cylindrical portion 42 of the click member 40 opposes the slope base portion 52, and the diameter of the spring 48 is set to be generally the same as the width of the slope base portion 52, so the click mechanism 28 can cause a sufficient load to act on the shift lever 20.

Second Embodiment

Next, a shift device 60 pertaining to a second embodiment of the disclosure will be described using FIG. 11 to FIG. 15. It will be noted that configurations in the second embodiment that are substantially the same as those in the first embodiment are assigned identical reference signs and description thereof will be omitted as appropriate.

Figure 11:
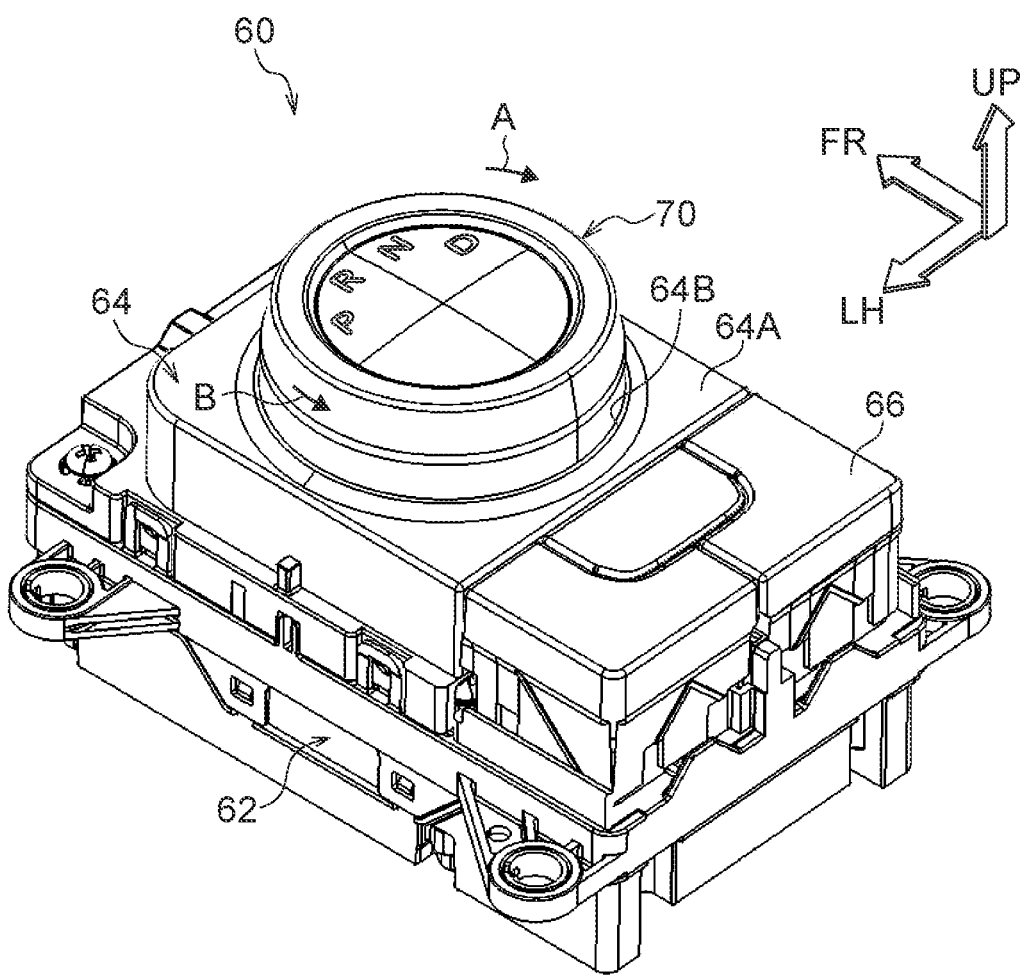
FIG. 11 is a perspective view showing a shift device pertaining to a second embodiment of the disclosure as seen from the rear left side and obliquely from the upper side.

In FIG. 11 the shift device 60 pertaining to the second embodiment of the disclosure is shown in a perspective view seen from the rear left side and obliquely from the upper side. Furthermore, in FIG. 12 part of the structure of the shift device 60 is shown in an exploded perspective view seen from the rear left side and obliquely from the upper side. It will be noted that, in the drawings, arrow FR indicates a forward direction of the shift device 60, arrow LH indicates a leftward direction of the shift device 60, and arrow UP indicates an upward direction of the shift device 60.

The shift device 60 shown in FIG. 11 is a shift-by-wire type of shift device, is installed in a console (not shown in the drawings) of a vehicle (an automobile) as an example, and is disposed on the vehicle front side and the vehicle width direction inner side of a driver's seat (not shown in the drawings) in the vehicle. The forward direction, the leftward direction, and the upward direction of the shift device 60 are aligned with the forward direction, the leftward direction, and the upward direction, respectively, of the vehicle.

Figure 12:
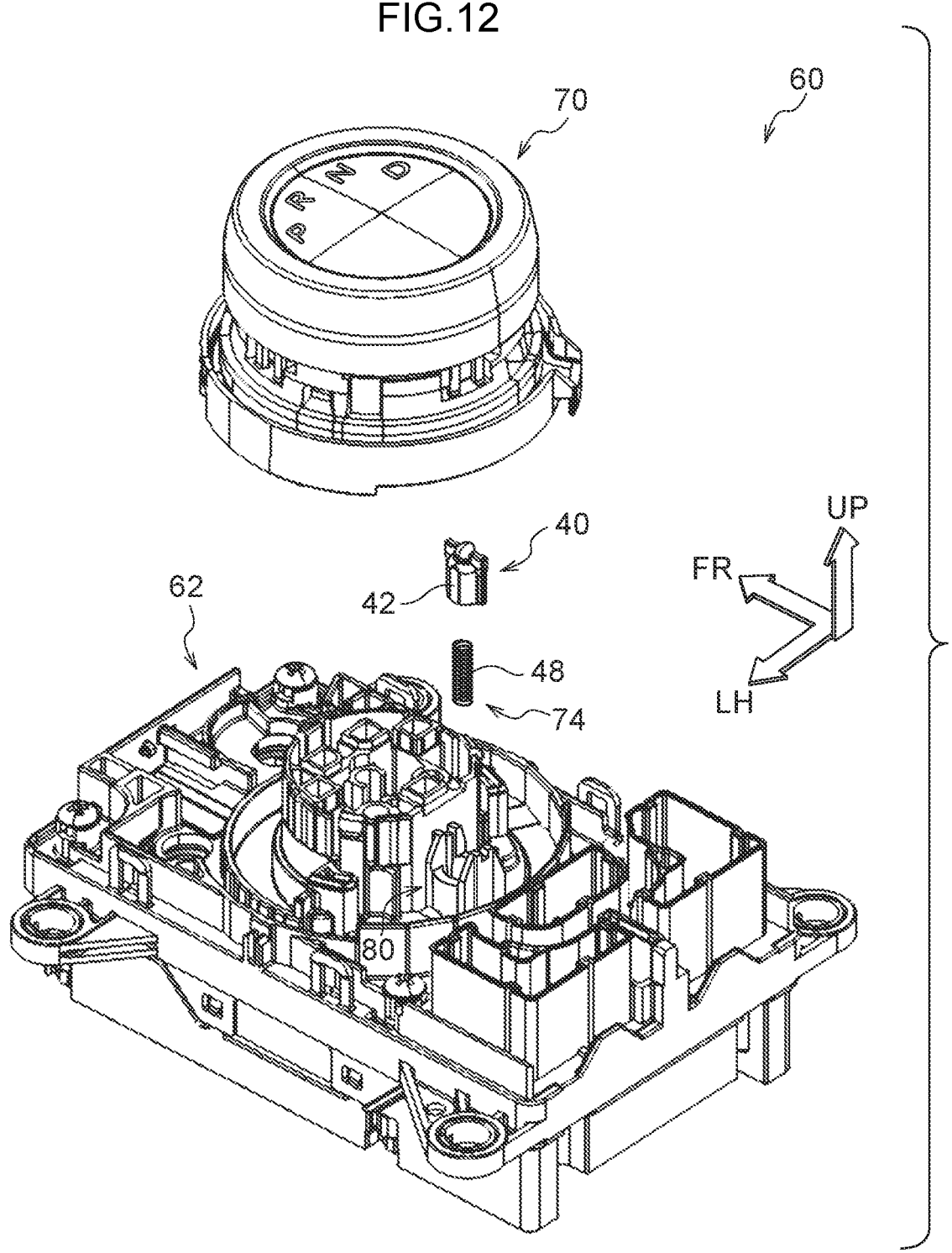
FIG. 12 is an exploded perspective view showing part of the structure of the shift device pertaining to the second embodiment of the disclosure as seen from the rear left side and obliquely from the upper side.

As shown in FIG. 11 and FIG. 12, the shift device 60 includes a casing 62 made of resin. As shown in FIG. 11, a first cover member 64 is secured to the upper side of the casing 62 ranging from the front portion to the front and rear direction middle portion thereof, and a second cover member 66 is secured to the upper side of the rear portion of the casing 62. A circular pass-through hole 64B is formed through an upper wall portion 64A of the first cover member 64 in the up and down direction.

Through the pass-through hole 64B is passed a knob 70 serving as a shift body and having an outer shape substantially in the shape of a cylinder. The knob 70 is disposed such that its center axis direction coincides with the up and down direction, is supported in the casing 62, and is rotated (moved) about an axis in the up and down direction (see arrow A and arrow B) to change the shift position of the knob 70. That is, the knob 70 is configured to be rotated by an occupant (particularly a driver) of the vehicle such that the knob 70 can be moved to shift positions including a parking (P) position, a reverse (R) position, a neutral (N) position, and a drive (D) position.

Figure 13:
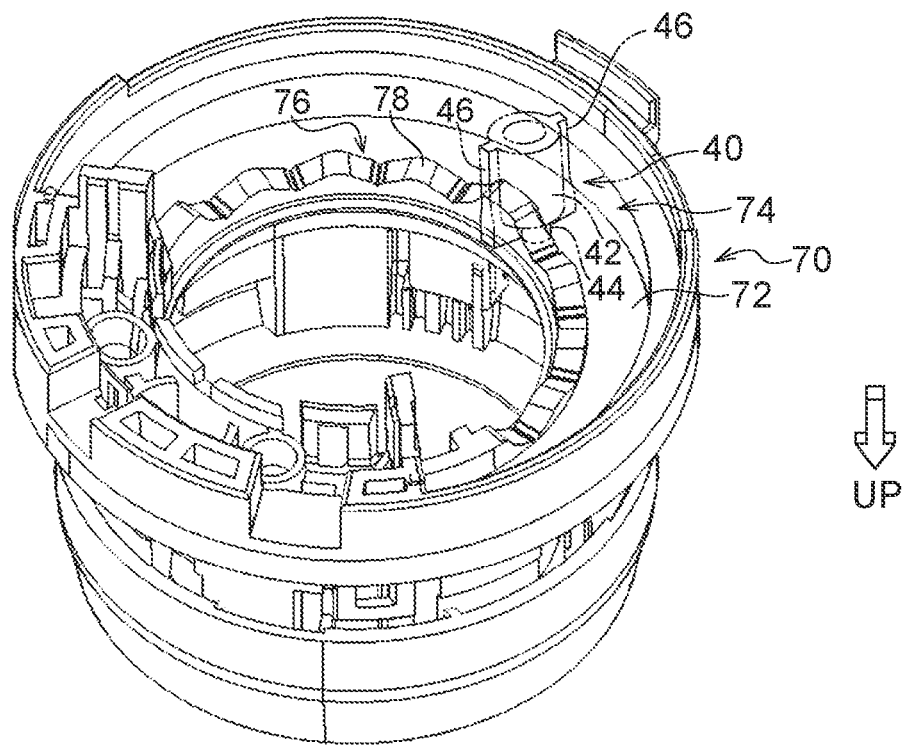
FIG. 13 is a perspective view showing a knob in the shift device pertaining to the second embodiment of the disclosure as seen obliquely from the lower side.

In FIG. 13 is shown a perspective view showing the knob 70 as seen obliquely from the lower side. As shown in FIG. 13, the knob 70 includes an annular lower wall portion 72 formed in an annular shape as seen in a bottom view. The annular lower wall portion 72 is a part that extends a predetermined length inward from the outer peripheral end portion of the lower portion of the knob 70. A click-use projecting portion (also called a "click crest") 76 that projects downward from part of the inner peripheral end portion of the annular lower wall portion 72 is formed on the annular lower wall portion 72. The click-use projecting portion 76 is formed in the shape of a circular arc as seen in a bottom view. The lower surface of the click-use projecting portion 76 is a click surface 78 configuring part of a click mechanism 74. The click surface 78 is formed in a concavo-convex shape. The concavo-convex shape of the click surface 78 is formed matching the shift positions of the knob 70.

Figure 14:
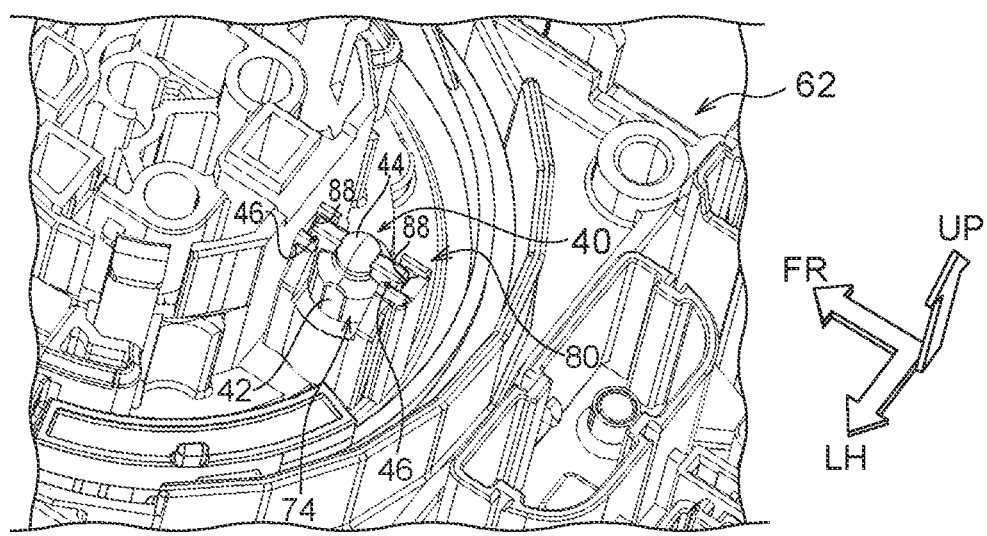
FIG. 14 is a perspective view showing part of an upper portion of a casing to which the click member is attached in the shift device pertaining to the second embodiment of the disclosure as seen from the rear left side and obliquely from the upper side.

In FIG. 14 is shown a perspective view showing part of the upper portion of the casing 62 to which a click member 40 is attached as seen from the rear left side and obliquely from the upper side. The click member 40 shown in FIG. 14 is the same member as the click member 40 (see FIG. 4, etc.) of the first embodiment, but it is disposed upside down from the first embodiment. Furthermore, the click member 40 shown in FIG. 14 is movable in the up and down direction and, as an example, is disposed so that the pair of guided portions 46 are on the front side and the rear side in the front and rear direction.

A spring 48 (see FIG. 12) is inserted from below into, and disposed inside, the cylindrical portion 42 of the click member 40. The click member 40 and the spring 48 (see FIG. 12) each configure part of the click mechanism 74 and are attached to an attachment receiving portion 80 formed in the casing 62.

Figure 15:
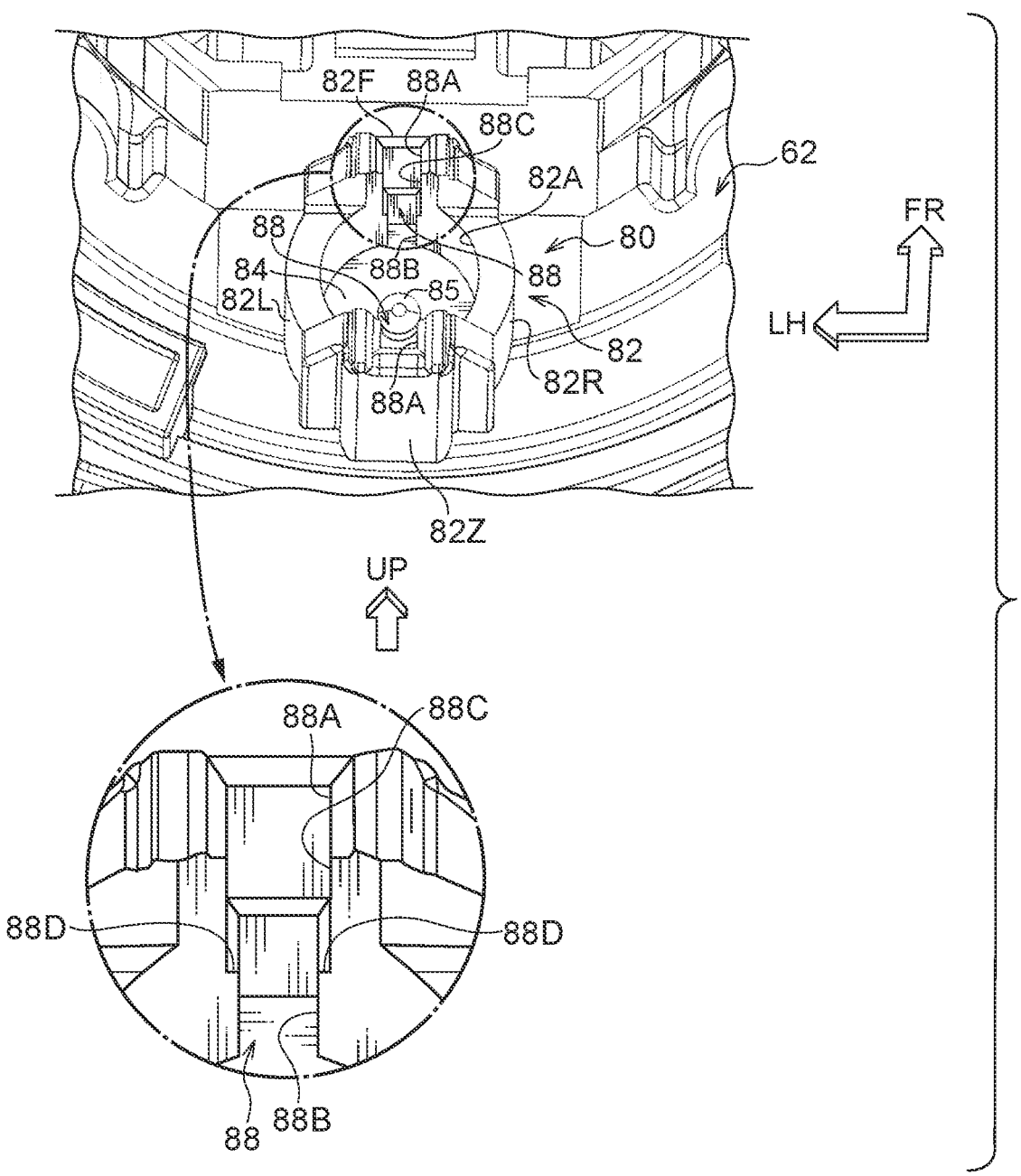
FIG. 15 is an enlarged perspective view showing a state before a spring and the click member are attached to the attachment receiving portion of the upper portion of the casing in the shift device pertaining to the second embodiment of the disclosure as seen obliquely from the upper rear side.

In FIG. 15 is shown an enlarged perspective view showing the attachment receiving portion 80 in a state before the spring 48 and the click member 40 (see FIG. 12 for both) are attached as seen obliquely from the upper rear side. As shown in FIG. 15, the attachment receiving portion 80 includes a housing cylinder 82 that extends in a substantially cylindrical shape upward and opens upward. An upper end side open portion 82A of the housing cylinder 82 is formed in a substantially circular shape when seen overall. A front wall portion 82F and a rear wall portion 82Z of the housing cylinder 82 extend a longer length upward than a circular arc-shaped left wall portion 82L and a circular arc-shaped right wall portion 82R of the housing cylinder 82. The upper portions of the front wall portion 82F and the rear wall portion 82Z of the housing cylinder 82 are formed in tapered shapes heading upward as seen in the front and rear direction. The lower end portion of the inside of the housing cylinder 82 is closed off by a bottom wall portion 84. The bottom wall portion 84 serves as a seat portion for the spring 48 (see FIG. 12). In the center portion of the bottom wall portion 84 is formed a spring retaining convex portion 85 that is inserted into the lower end portion side of the spring 48 (see FIG. 12).

The spring 48 shown in FIG. 12 is interposed between the seat portion (not shown in the drawings) inside the cylindrical portion 42 of the click member 40 and the bottom wall portion 84 of the attachment receiving portion 80 shown in FIG. 15 and biases the click member 40 shown in FIG. 14 upward. The click member 40 is biased by the spring 48 (see FIG. 12) so that the projecting portion 44 abuts against the click surface 78 shown in FIG. 13. In FIG. 13, an example of the click member 40 that abuts against the click surface 78 is simplified and indicated by a long dashed double-short dashed line. Furthermore, as shown in FIG. 13, the middle portion of the cylindrical portion 42 of the click member 40 in the direction in which the pair of guided portions 46 are lined up opposes the click-use projecting portion 76. The click mechanism 74 is configured so that when the knob 70 is rotatingly operated (movingly operated), the click surface 78 rotates (moves) in accompaniment with the rotation (movement) of the knob 70 and the click member 40 rides up over the convex parts of the click surface 78, thus imparting a clicking feel to the knob 70.

As shown in FIG. 15, in the mutually opposing surfaces of the front wall portion 82F and the rear wall portion 82Z in the housing cylinder 82 are formed guide insertion portions 88 serving as guide portions. The guide insertion portions 88 are parts that guide the click member 40 (see FIG. 14) to the click surface 78 (see FIG. 13). The guide insertion portions 88 are formed as grooves in such a way that the click member 40 (see FIG. 14) can be inserted into them and extend in the direction in which they guide the click member 40 (see FIG. 14). The guide insertion portions 88 each have the shape of a rectangular recess as seen in a bottom view. As shown in FIG. 14, the guided portions 46 of the click member 40 are inserted into the guide insertion portions 88. The guided portions 46 extend in the direction in which they are guided by the guide insertion portions 88 and are configured to slide in the guide insertion portions 88.

The guide insertion portions 88 are disposed in positions in which they do not oppose the click surface 78 (see FIG. 13) in the up and down direction. More specifically, the guide insertion portions 88 are provided as a pair in positions offset on both lateral sides relative to the click surface 78 as seen from the opposite side of the click surface 78 (see FIG. 13). To achieve this configuration, the opposing distance between the front wall portion 82F and the rear wall portion 82Z of the attachment receiving portion 80 shown in FIG. 15 is set greater than the width of the click-use projecting portion 76 (see FIG. 13), and the front wall portion 82F and the rear wall portion 82Z are disposed in positions in which they do not oppose the click-use projecting portion 76 (see FIG. 13) in the up and down direction.

Furthermore, distal end portions 88A of the guide insertion portions 88 in the guidance direction (in the present embodiment, the upward direction side) are open. Moreover, as shown in the partially enlarged view of FIG. 15, in the guide insertion portions 88 are step portions 88D that make the width of first constituent portions 88B, where the guided portions 46 (see FIG. 14) are inserted into parts of the guide insertion portions 88 on the opposite side (in the present embodiment, the downward direction side) of the distal end portion 88A side, smaller than the width of second constituent portions 88C, where the guided portions 46 (see FIG. 14) are inserted into the other parts of the guide insertion portions 88. The step portions 88D are provided as a left and right pair.

Next, the action of the present embodiment will be described.

In the shift device 60 shown in FIG. 11 having the above configuration, the knob 70 is rotated (moved) to change the shift position of the knob 70. Furthermore, the click mechanism 74 that biases the click member 40 shown in FIG. 13 to abut against the click surface 78 is configured so that when the knob 70 is rotatingly operated (movingly operated), the click surface 78 rotates (moves) in accompaniment with the rotation (movement) of the knob 70 and the click member 40 rides up over the convex parts of the click surface 78, thus imparting a clicking feel to the knob 70.

Here, the guide insertion portions 88 shown in FIG. 14 that guide the click member 40 to the click surface 78 are disposed in positions in which they do not oppose the click surface 78 (see FIG. 13) in the up and down direction. For this reason, compared to a contrasting structure where, for example, the guide portions that guide the click member are disposed in positions in which they oppose the click surface, the structure for imparting the clicking feel can be reduced in size in the guidance direction of the click member 40.

Furthermore, in the present embodiment, the guide insertion portions 88 are provided as a pair in positions offset on both lateral sides relative to the click surface 78 as seen from the opposite side of the click surface 78 shown in FIG. 13. For this reason, the pair of guide insertion portions 88 (see FIG. 14) can stably guide the click member 40 to the click surface 78.

Furthermore, as shown in FIG. 15, in the housing cylinder 82 of the casing 62 made of resin there is a space between the upward projecting parts (the parts that project beyond the left wall portion 82L and the right wall portion 82R) of the front wall portion 82F and the rear wall portion 82Z, and the size of the upward projecting parts is kept small. For this reason, even if the dimensions of the upward projecting parts were to change due to at least one of heat and moisture absorption, the amount of the change is kept small. Consequently, the dimensional accuracy of the housing cylinder 82 of the casing 62 can be improved and, in turn, the product accuracy of the casing 62 can be improved.

Furthermore, in the present embodiment, as shown in FIG. 14, the guide insertion portions 88 are formed in such a way that the click member 40 can be inserted into them and extend in the direction in which they guide the click member 40, and the guided portions 46 of the click member 40 extend in the direction in which they are guided by the guide insertion portions 88 and are inserted into the guide insertion portions 88. For this reason, rattling of the click member 40 guided by the guide insertion portions 88 is inhibited, and durability can be ensured.

Moreover, in the present embodiment, as shown in FIG. 15, the distal end portions 88A of the guide insertion portions 88 in the guidance direction are open. Furthermore, as shown in the partially enlarged view of FIG. 15, in the guide insertion portions 88 are formed the step portions 88D that make the width of the first constituent portions 88B, where the guided portions 46 (see FIG. 14) are inserted into the parts of the guide insertion portions 88 on the opposite side of the distal end portion 88A side, smaller than the width of the second constituent portions 88C, where the guided portions 46 (see FIG. 14) are inserted into the other parts of the guide insertion portions 88. For this reason, enlargement of the width dimensions (left and right direction dimensions) of the first constituent portions 88B and the second constituent portions 88C due to the draft angle of a molding die for forming the first constituent portions 88B and the second constituent portions 88C can be reduced. For that reason, rattling of the guided portions 46 (see FIG. 14) in the left and right direction relative to the first constituent portions 88B and the second constituent portions 88C can be inhibited, and rattling of the click member 40 (see FIG. 14) in the left and right direction relative to the attachment receiving portion 80 can be inhibited.

It will be noted that although in the first embodiment and the second embodiment shown in FIG. 1 to FIG. 15 the guide insertion portions 38, 88 serving as guide portions are provided as a pair in positions offset on both lateral sides relative to the click surfaces 54, 78 as seen from the opposite side of the click surfaces 54, 78, as an example modification, a configuration may also be used where one guide portion is provided in a position offset on one lateral side relative to the click surface (54, 78) as seen from the opposite side of the click surface (54, 78).

Furthermore, in the first embodiment and the second embodiment, the guide insertion portions 38, 88 serving as guide portions are formed as grooves, but as an example modification, the guide insertion portions may also be formed as something other than grooves, such as, for example, guide-use elongate holes that are formed through the attachment receiving portion in such a way that the click member (40) can be inserted into them and extend in the direction in which they guide the click member 40. Furthermore, the guide portions need not be guide insertion portions as long as they can guide the click member (40) to the click surface (54, 78).

Furthermore, in the first embodiment and the second embodiment, the guided portions 46 of the click member 40 inserted into the guide insertion portions 38, 88 extend in the extension direction of the guide insertion portions 38, 88, but as an example modification, a configuration may also be used where, for example, the parts of the click member that are inserted into the guide insertion portions (38, 88) are plurally formed intermittently in the extension direction of the guide insertion portions (38, 88).

Furthermore, in the first embodiment and the second embodiment, in the guide insertion portions 38, 88 are formed the step portions 38D, 88D that make the width of the first constituent portions 38B, 88B smaller than the width of the second constituent portions 38C, 88C, but as an example modification, a configuration may also be used where step portions are not formed in the guide insertion portions.

Furthermore, the first embodiment and the second embodiment may be combined with the plural example modifications as appropriate and implemented.

Examples of the present disclosure have been described above, but the present disclosure is not limited to what is described above and of course may, in addition to what is described above, be modified in various ways and implemented without departing from the spirit thereof

What is claimed is:

1. A shift device comprising:
a shift body that is moved to change a shift position of the shift body;
a click mechanism having a click member and a click surface against which the click member is biased to abut, the click mechanism being configured so that, when the shift body is movably operated, one of the click member or the click surface moves in accompaniment with movement of the shift body and imparts a clicking feel to the shift body; and
at least one guide portion that guides the click member to the click surface and that is disposed in a position in which it does not oppose the click surface,
wherein the shift body includes an insertion hole into which the click member is inserted and a pair of separated pendent portions that protrude toward the click surface from a click surface side end of the insertion hole,
wherein each of the at least one guide portion is a groove provided at the pair of pendent portions,
the click member includes at least one guided portion which is inserted into the at least one guide portion, and
the pair of pendent portions include the at least one guide portion, which is provided in a position offset on one lateral side relative to the click surface as seen from an opposite side of the click surface.

2. The shift device of claim 1, wherein the pair of pendent portions are provided as an opposing pair in positions offset on both lateral sides relative to the click surface as seen from an opposite side of the click surface, and a guide portion is provided at each of the pair of pendent portions.

3. The shift device of claim 1, wherein:
each of the at least one guide portion is a guide insertion portion that is formed in such a way that the click member can be inserted therein and that extends in a direction in which it guides the click member, and the click member has a guided portion that extends in a direction in which it is guided by the guide insertion portion and that is inserted into the guide insertion portion.

4. The shift device of claim 3, wherein a distal end portion of the guide insertion portion in the guidance direction is open, and in the guide insertion portion are step portions that make a width of first constituent portions of the insertion hole that touch the guided portion smaller in the guidance direction of the guide insertion portion than a width of second constituent portions of the insertion hole that touch the guided portion.

5. A shift device comprising:
a shift body that is moved to change a shift position of the shift body;
a click member;
a click surface against which the click member is biased to abut;
a click mechanism whereby the click member imparts a clicking feel to the shift body; and
a guide portion that guides the click member to the click surface and that is disposed in a position in which it does not oppose the click surface in a biasing direction,
wherein, when the shift body is movingly operated, one of the click member or the click surface moves in accompaniment with movement of the shift body,
wherein the shift body includes an insertion hole into which the click member is inserted and a pair of separated pendent portions that protrude toward the click surface from a click surface side end of the insertion hole,
wherein the guide portion is a groove provided at each of the pair of pendent portions,
the click member includes a guided portion which is inserted into the guide portion, and
the guide portion is provided in a position offset on one lateral side relative to the click surface as seen from an opposite side of the click surface.

6. The shift device of claim 5, wherein the pendent portions are provided as an opposing pair in positions offset on both lateral sides relative to the click surface as seen from an opposite side of the click surface.

7. The shift device of claim 1, wherein:
the guide portion extends in a direction in which it guides the click member, and the click member has a guided portion, the guided portion being inserted into, and extending in the direction in which it is guided by, the guide insertion portion.

8. The shift device of claim 3, wherein a distal end portion of the guide insertion portion in the guidance direction is open, the guide insertion portion includes step portions in parts thereof on an opposite side from the distal end portion side, and the step portions make a width of first constituent portions of the insertion hole that touch the guided portion smaller, in the guidance direction of the guide insertion portion, than a width of second constituent portions of the insertion hole that touch the guided portion.

9. The shift device of claim 2, wherein the at least one guide portion is a pair.

10. The shift device of claim 6, wherein the at least one guide portion is a pair.

11. The shift device of claim 2, wherein the at least one guided portion is a pair.

12. The shift device of claim 6, wherein the at least one guided portion is a pair.

* * * * *